A. J. TRUXELL.
Sausage Machine.
No. 80,035.
Patented July 14, 1868.
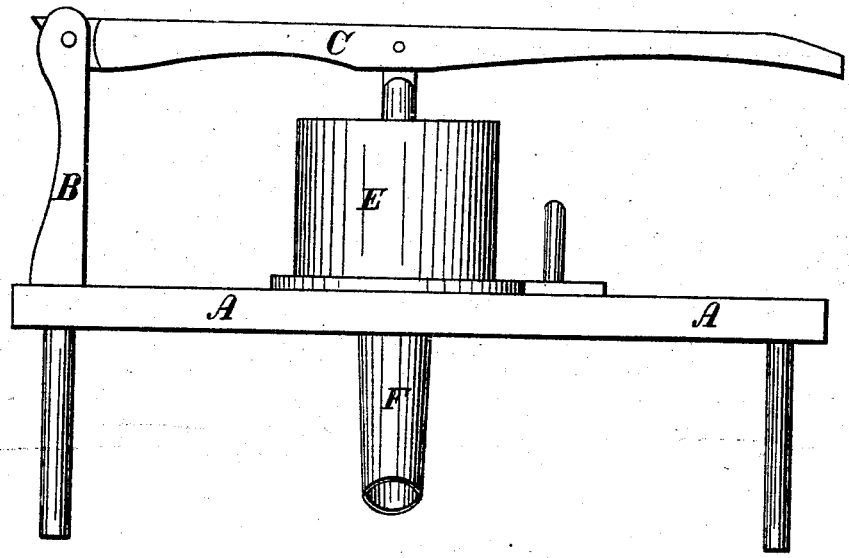
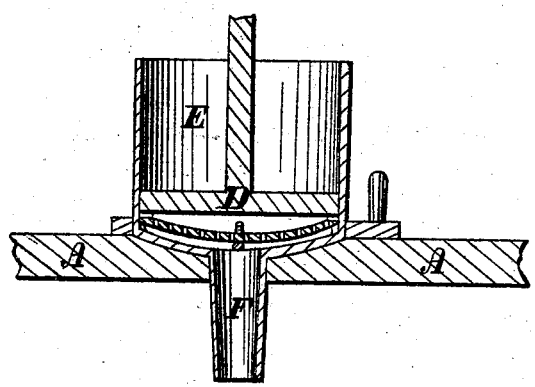
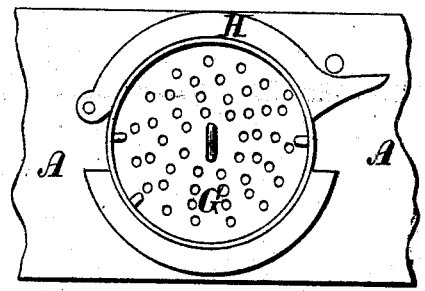
Witnesses
Wm Wansleben
Leopold Evert
Inventor
A. J. Truxell
per Alexander F. Mason,
Atty.

United States Patent Office.

A. J. TRUXELL, OF SALEM, VIRGINIA.

Letters Patent No. 80,035, dated July 14, 1868.

IMPROVED LARD-PRESS AND SAUSAGE-STUFFER.

*The Schedule referred to in these Letters Patent and making part of the same.*

TO ALL WHOM IT MAY CONCERN:

Be it known that I, A. J. TRUXELL, of Salem, in the county of Roanoke, and in the State of Virginia, have invented certain new and useful Improvements in Combined Lard-Press and Sausage-Stuffer; and do hereby declare that the following is a full, clear, and exact description thereof, reference being made to the accompanying drawings, and to the letters of reference marked thereon.

In the annexed drawings, forming part of this specification—

Figure 1 is a horizontal view.

Figure 2 a sectional view, and

Figure 3 a plan view.

The nature of my invention consists in providing the bottom of the cup or dish with a tube or funnel, and a movable perforated bottom inside, and also in providing the bench on which the cup stands with a device for fastening the same to it.

To enable others skilled in the art to make and use my invention, I will proceed to describe its construction and operation.

A represents a wooden bench, which in one end has a post, B. To the post B the lever C is pivoted, and the follower D is hung on this lever in such a manner that it works up and down in the cup or dish E when the lever is raised or lowered. The cup or dish E, which is made of tin or any other suitable material, has a concave bottom, with a tube, F, running down from the centre. This tube F, which is used for stuffing sausages, can be replaced with a funnel when the machine is to be used as a press or strainer, or the tube may act as a funnel for that purpose. The inside of the concave bottom of the cup E is provided with catches to fit in notches on the perforated strainer G, as shown in fig. 3. The perforated movable bottom or strainer G can be made of tin, zinc, or other suitable material, and is provided with flanges or ribs on its lower side, so as to form a vacuum on the inside between the two bottoms.

The bench A has a hole cut through it to insert the tube or funnel F, and the cup or dish E is held steady on the bench by means of a circular clamp, H, or any other suitable device, as shown in fig. 3.

Having thus fully described my invention, what I claim as new, and desire to secure by Letters Patent, is—

The combination of the removable cup E formed with a concaved bottom and spout F, and provided with a perforated plate, G, with the bench A, lever C, follower D, and pivoted latch H; all constructed and operating as set forth.

In testimony that I claim the foregoing, I have hereunto set my hand, this 20th day of April, 1868.

A. J. TRUXELL.

Witnesses:
Z. BOON,
A. N. BROWN.